United States Patent [19]

Turner

[11] Patent Number: 4,601,871
[45] Date of Patent: Jul. 22, 1986

[54] STEADY STATE COMPACT TOROIDAL PLASMA PRODUCTION

[75] Inventor: William C. Turner, Livermore, Calif.

[73] Assignee: The United States of America as represented by the United States Department of Energy, Washington, D.C.

[21] Appl. No.: 495,386

[22] Filed: May 17, 1983

[51] Int. Cl.$^4$ .............................................. G21B 1/00
[52] U.S. Cl. .................................. 376/144; 376/107; 376/128; 376/143; 376/145
[58] Field of Search ...................... 313/231.41, 231.51, 313/362.1; 315/111.41, 111.61, 111.71; 376/107, 128, 139, 143, 144, 145

[56] References Cited

U.S. PATENT DOCUMENTS

| | | | |
|---|---|---|---|
| 2,920,235 | 1/1960 | Bell et al. | 376/107 |
| 3,039,014 | 6/1962 | Chieh Chien Chang | 376/128 |
| 3,085,173 | 4/1963 | Gibson et al. | 376/107 |
| 3,125,492 | 3/1964 | Baker | 376/107 |
| 3,338,789 | 8/1967 | Fink | 376/145 |
| 4,042,848 | 8/1977 | Lee | 376/145 |
| 4,248,665 | 2/1981 | Thode | 376/105 |
| 4,314,879 | 2/1982 | Hartman et al. | 376/128 |

FOREIGN PATENT DOCUMENTS

| | | | |
|---|---|---|---|
| 886165 | 1/1962 | United Kingdom | 376/144 |
| 892344 | 3/1962 | United Kingdom | 376/128 |
| 911510 | 11/1962 | United Kingdom | 376/144 |
| 374041 | 10/1979 | U.S.S.R. | 315/111.41 |

OTHER PUBLICATIONS

UCRL-87004 Rev. 1, "Investigations of the Magnetic Structure and the Decay of a Plasma-Gun-Generated Compact Torus," Feb. 14, 1983.
"Analytic Snowplow-Sharp Boundary Model of a Magnetized Co-Axial Gun", 1982, IEEE International Conference on Plasma Science.
IAEA-CN-41/M-2-2, "Compact Toroidal Plasmas: Simulations and Theory".
UCRL-52922, "Use of Coaxial Plasma Guns to Start Up Field-Reversed-Mirror Reactors".
UCRL-84228, "Field Reversal Produced by a Plasma Gun".
Taylor, "Relaxation of Toroidal Plasma and Generation of Reverse Magnetic Fields," *Physical Review Letters*, vol. 33, 1974.

Primary Examiner—Deborah L. Kyle
Assistant Examiner—Richard W. Wendtland
Attorney, Agent, or Firm—Gregory D. Ogrod; Michael B. K. Lee; Judson R. Hightower

[57] ABSTRACT

Apparatus and method for maintaining steady state compact toroidal plasmas. A compact toroidal plasma is formed by a magnetized coaxial plasma gun and held in close proximity to the gun electrodes by applied magnetic fields or magnetic fields produced by image currents in conducting walls. Voltage supply means maintains a constant potential across the electrodes producing an increasing magnetic helicity which drives the plasma away from a minimum energy state. The plasma globally relaxes to a new minimum energy state, conserving helicity according to Taylor's relaxation hypothesis, and injecting net helicity into the core of the compact toroidal plasma. Controlling the voltage so as to inject net helicity at a predetermined rate based on dissipative processes maintains or increases the compact toroidal plasma in a time averaged steady state mode.

15 Claims, 8 Drawing Figures

STEADY STATE COMPACT TOROIDAL PLASMA PRODUCTION

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

This invention relates to the confinement of field reversed plasma rings and, more particularly, to the steady state maintainance of field reversed plasma rings produced by coaxial plasma guns.

Compact toroidally shaped plasmas (CT's) or field reversed plasma rings having both toroidal and poloidal magnetic field components are presently created with co-axial plasma guns, electrodeless flux-core induction and pinch discharges. These donut shaped plasmas have closed toroidal magnetic flux surfaces produced by currents within the CT. Currents flowing in external, adjacent, conducting walls or magnetic coils are required to maintain radial equilibrium, but external wall and coil structures do not link the plasma as in a tokamak and other toroidal configurations.

Compact toroidally shaped plasmas can be used to inject either constituent particles or stored energy into magnetic plasma confinement devices or as targets for other particle or energy sources. Therefore, CTs are of great interest for fusion reactors. From a fusion reactor standpoint, a CT has a number of advantages including simplification of hardware, including materials design, and size reduction because the closed flux surfaces alleviate the need for current linking structures.

In order to utilize a CT for power production in a plasma confinement apparatus or fusion reactor it is necessary to maintain the CT above the so-called Lawson criteria of $5 \times 10^{13}$ particles per square centimeter-sec. and at a sufficiently high temperature (on the order of 6–25 KeV) in order to achieve fusion reactions or interactions. To meet this criteria high density CT's must be produced having a large amount of internal energy or, alternatively, energy and particles added after initial CT formation (or the CT compressed to achieve higher densities). Energy and particle deposition after formation is preferred since the instantaneous power required at formation for higher energy and density CT's places constraints on hardware and is outside of current technology.

Energy in a CT is present in two forms, magnetic energy due to currents flowing in the plasma and thermal energy of the plasma particle species. The magnetic energy is needed to confine the particle species undergoing fusion reactions. The thermal energy (6–25 keV per particle) is necessary to produce sufficient fusion reactions to satisfy the Lawson criteria. The currents flowing within a CT are, however, subject to resistive interaction from the particle species making up the plasma causing ohmic losses or dissipation of the energy stored in such currents. Some of the magnetic energy is continuously converted to thermal energy by ohmic dissipation and unless replenished this leads to loss of confinement and destruction of the CT. The ohmically dissipated energy heats the particle species and is ultimately lost from the CT by particle transport or impurity radiation.

These dissipative mechanisms eventually lead to the loss of internal currents and the closed magnetic flux surfaces of a CT. Therefore, it can be appreciated that it is necessary to add magnetic energy in order to at least maintain a CT in a steady state. It is the main objective of this invention to continuously add magnetic energy to the CT and thus maintain a steady state CT.

There are three basic approaches that have previously been considered for magnetic energy deposition in toroidal plasma devices: injected neutral or charged particle beam currents (such as disclosed in U.S. Pat. No. 4,232,244 to J. H. Fink and A. W. Molvik), currents driven by application of radio frequency waves and currents driven by inductive coupling. Injected particle beam currents and currents driven by radio frequency waves involve complex technologies, and it is not known whether either of these will have high enough efficiency for steady state current drive of a power producing fusion reactor. It is also not presently known whether a radio frequency wave exists that is accessible for driving currents in the interior of a CT plasma.

Inductive coupling techniques have the advantage of simple technology. The energy is coupled to the plasma by transformer action from current carrying means surrounding the CT. Induced currents use the aforementioned ohmic interaction process to resistively heat the plasma. As in a tokamak reactor, inductive coupling will not work for steady state operation since eventually a voltage limit or flux core saturation of the primary circuit is reached. There is an upper limit to the amount of energy that can be transferred to the CT.

These approaches all have technological difficulties and may not extrapolate to the high density, high temperature regime envisioned for CT reactors. In addition, although heating decreases the ohmic dissipation of plasma currents by decreasing the resistivity and prolongs the lifetime of a CT, it will not lead to a steady state, which is desirable from a fusion reactor viewpoint, unless magnetic flux is also added. The magnetic flux is necessary in order to maintain the currents of the CT configuration.

Any current drive or magnetic energy deposition technique will also increase plasma thermal energy via ohmic dissipation of the driven currents. However, particle beams and radio frequency waves may also be used to directly increase the plasma thermal energy without driving the current necessary to maintain the CT configuration. The physics and technology of plasma heating by particle injection and radio frequency waves is more advanced than current drive by either of these methods. Because of the decreasing effectiveness of ohmic heating as the plasma temperature increases, it may be desirable to use particle beams or radio frequency waves for heating the plasma to fusion reactor temperatures, while using the invention described below to maintain the necessary magnetic fields in steady state.

SUMMARY OF THE INVENTION

In light of the above problems, it is an object of this invention to continuously add net magnetic helicity and, therefore, magnetic flux and energy to a CT without requiring the use of particle beams, R-F waves or inductive coupling.

It is also an object of this invention to reduce the amount of instantaneous power required in the formation of a CT for use in a fusion confinement device.

It is another object of this invention to provide a method for increasing the energy level of a CT without adding to dissipative loss mechanisms.

It is a further object of this invention to increase the efficiency for energy transfer to a CT.

It is a further object of this invention to increase the efficiency of CT formation and sustanance.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Accordingly the foregoing and other objects are realized in an apparatus comprising at least one magnetized coaxial plasma gun having cylindrically symmetric solenoidal electrodes for generating a poloidal magnetic field, gas input means for providing particle species for a discharge between said electrodes, an open annular breech for passage of a resulting toroidal plasma, means for containing the magnetic flux of a toroidal plasma operationally connected to said gun and a means for producing an increasing helicity between the electrodes, being operatively coupled to said electrodes.

In a further aspect of the present invention a method for producing steady state field-reversed toroidal plasmas using a magnetized coaxial plasma gun having cylindrically symmetric solenoidal electrodes for generating a poloidal magnetic field, gas input means providing particle species for a discharge between said electrodes, and an open annular breech for passage of a resulting compact toroidal plasma. The method comprises the steps of generating a plasma by discharging a voltage pulse from an energy storage power source across the electrodes of the plasma gun through a particle medium contained between the electrodes, confining the resulting CT within a conducting wall boundary region and/or external array of poloidal field coils adjacent and connected to said plasma gun, providing additional particles between said coaxial gun electrodes and applying a constant DC voltage to said electrodes from a voltage source electrically connected to said electrodes after CT formation.

DRAWINGS

The accompanying drawings, which are incorporated and form a part of the specification, illustrate an embodiment of the invention and, together with the description, serve to explain the principles of the invention.

DESCRIPTION OF PREFERRED EMBODIMENTS

Coaxial plasma guns are used to generate compact toroidally shaped plasmas (CT's) which are injected or accelerated into equilibrium field regions for producing and maintaining particle conditions sufficient for fusion interactions. The CT's produced have loss mechanisms, most notably, ohmic losses which decrease the amount of energy stored in the CT, eventually destroying it. It is therefore necessary to add energy to the CT in order to prevent decay and, in addition, to achieve sufficient energy to achieve fusion.

The present invention is a method and apparatus for maintaining the energy level of a CT after formation by adding net magnetic helicity to the CT.

Figure 1:
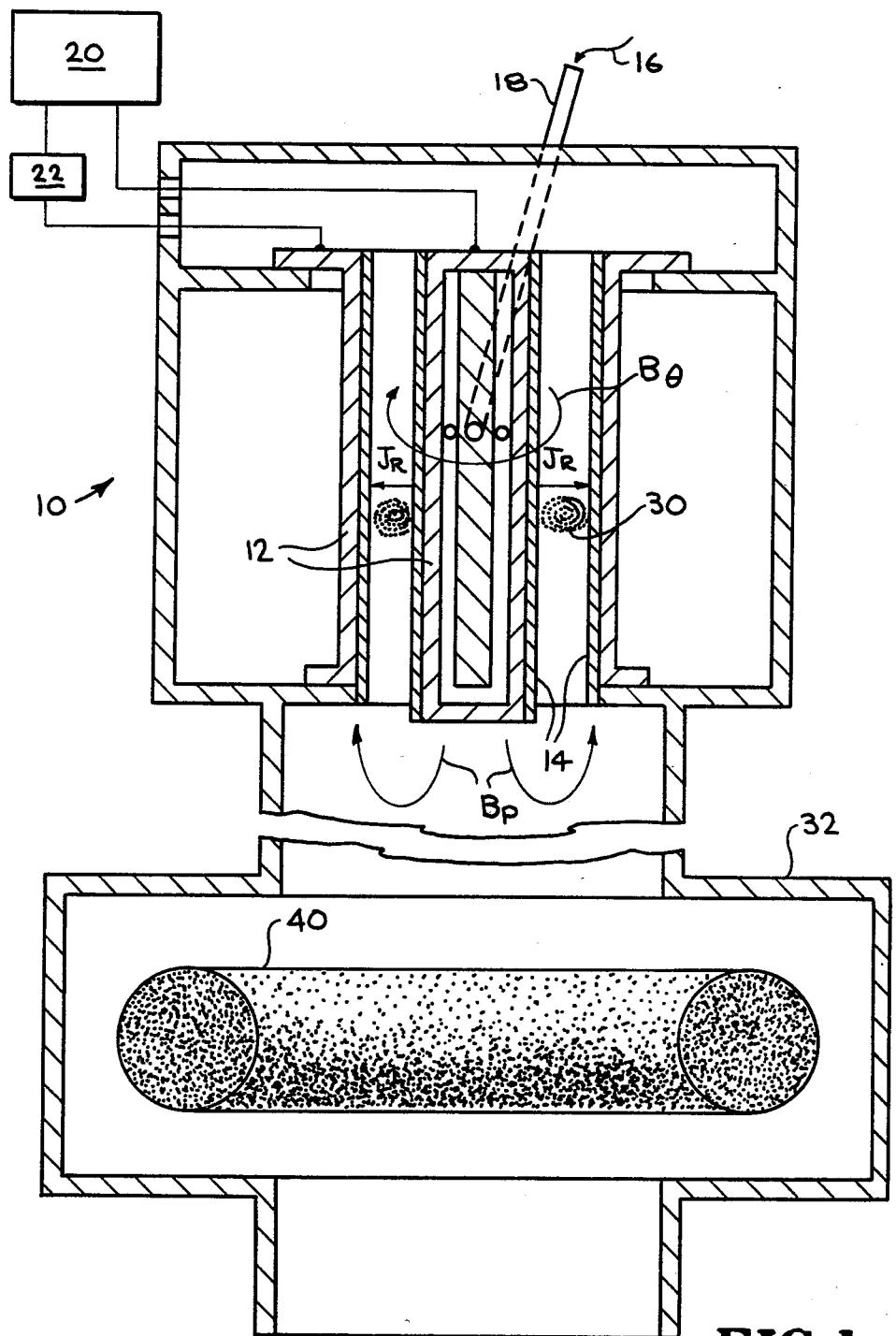
FIG. 1 is a schematic view of one embodiment of a magnetized coaxial plasma gun connected to a capacitive power supply for generating a plasma and also connected to a constant voltage power supply and in close proximity to an equilibrium field producing means.

An embodiment for realizing the invention is illustrated in FIG. 1. In FIG. 1, a magnetized coaxial plasma gun 10 having electrodes 12, receives a discharge particle source or gas 16 between electrodes 12 through input port 18. The quantity of particles or gas input through port 18 is determined by the density of the CT to be produced, the dimensions and parameters of gun 10 and the energy discharged across electrodes 12. Electrical energy source 20 is connected to electrodes 12 through switching means 22. Energy source 20 is of the energy storage type producing short duration pulses, on the order of fractions of a second, and exemplary energy sources include, but are not limited to, high energy capacitive bank power supplies. Energy source 20 is discharged across electrodes 12 through gas 16 producing a plasma 30 a large percentage of which is ejected from the gun breech by $j \times B$ forces forming CT 40.

Electrodes 12 may additionally be covered by coating means 14, which is a coating or liner of material capable of having hydrogen or deuterium gas absorbed onto it so as to minimize impurities such as carbon or oxygen from being produced by the plasma discharge and entering the forming CT. Coating means 14 can be made from several materials including but not limited to titanium, tantalum, vanadium, zirconium, or palladium.

After formation, CT 40 is held in an equilibrium field producing means 32 which is positioned in close proximity to gun electrodes 12. In a plasma gun apparatus such as the Beta II project at Lawrence Livermore National Laboratory (LLNL), as described in UCRL-52922, "Use of Coaxial Plasma Guns to Start Up Field-Reversed-Mirror Reactors", by A. C. Smith, Jr., et al. and UCRL-84228, "Field Reversal Produced by a Plasma Gun" by Charles W. Hartman, et al., this distance is approximately 1 to 2 meters. As will be appreciated by one practicing in the art, the exact position of equilibrium field producing means 32 relative to electrodes 12 of gun 10 is determined by the amount of energy in CT 40 at formation and the energy dissipation rate. These factors provide the time and distance over which CT 40 can be moved and stabilized before destruction. In one embodiment, as disclosed in FIG. 1, means 32 is a flux conservor having cylindrical walls of varying radii which produce equilibrium magnetic fields from induced image currents. Alternatively 32 could be, or include, an array of poloidal magnetic field coils producing a minimum magnetic field well in which CT 40 resides.

Compact toroidal plasmas produced by coaxial plasma guns relax after formation to a state that minimizes the magnetic energy $W_B$ $$W_B = \frac{1}{2\mu_o} \int B^2 d^3x. \qquad (1)$$

subject to the constraint that the magnetic helicity K is constant, $$K = \int \vec{A}\cdot\vec{B}d^3x. \qquad (2)$$

where $\vec{B} = \nabla \times A$. This is the so called Taylor minimum energy state as discussed in "Relaxation of Toroidal Plasma and Generation of Reverse Magnetic Fields", *Physical Review Letters*, Vol. 33, 1974, by J. B. Taylor. For this minimum energy state the total plasma magnetic energy and helicity are related by, $$W_B = \frac{k'}{2\mu_o} K. \qquad (3)$$

where $k'$ is a global constant determined by solving the eigen value equation $\nabla \times \vec{B} = k'\vec{B}$ in the region bounded by the gun electrodes and flux conserver. When a plasma gun like plasma gun 10 forms a CT, the magnetic helicity K input to the plasma gun during formation is given by, $$K = 2\psi_o \int_o^t V(t')dt'. \qquad (4)$$

where $\Psi_o$ is the magnetic flux superimposed on the inner gun electrode 12 and $$\int_o^t V(t')dt'$$

is the time integral of the voltage applied by energy source 20 between the coaxial gun electrodes 12. Using previous methods of operation, energy source 20 provides a voltage pulse of only five to ten microsecond duration, and the entire formation and relaxation of CT 40 occurs on the fast Alfven time scale. The CT 40 plasma then decays according to the aforementioned ohmic dissipation, $$\frac{dW_B}{dt} = -P_\eta \qquad (5)$$

$$= -\frac{2W_B}{\tau_\eta}.$$

Where $P_\eta$ is the ohmic power lost and $\tau_\eta$ the resistive decay time. The time constant $\tau$ is related to the plasma resistivity $\eta$ by $$\tau_\eta = \frac{\mu_o}{\eta k'^2}.$$

At this point energy source 20 is fully discharged and switching means 22 disconnects it from electrodes 12. Switching means 22 is any means capable of transferring the high energy stored in energy source 20 to electrodes 12 typically at a rate of several kiloamperes and impeding the transfer of energy during storage. This includes but is not limited to high power SCR's, thyratrons, or relays.

Figure 2:
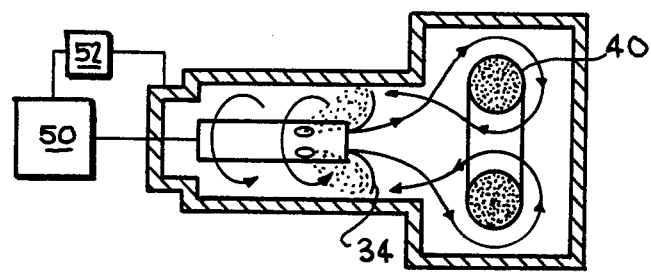
FIGS. 2a-2e are schematic of an increasing flux surface produced in a magnetized coaxial plasma gun after the formation of a CT while a constant voltage is maintained across the electrodes of the plasma gun.
Figure 2:
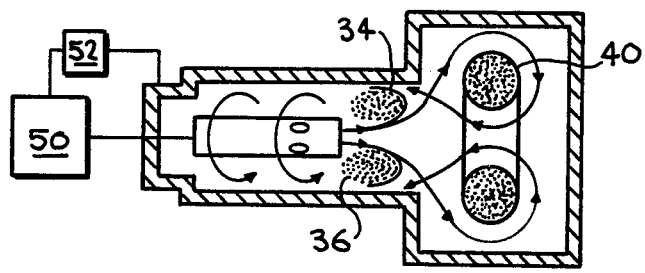
Figure 2:
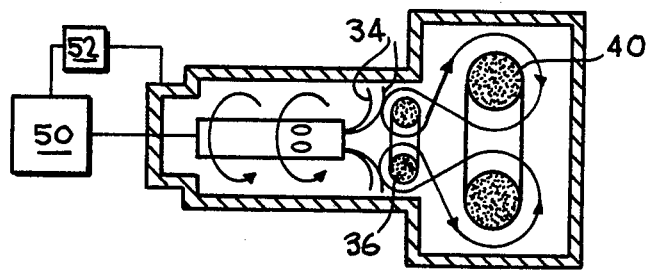
Figure 2:
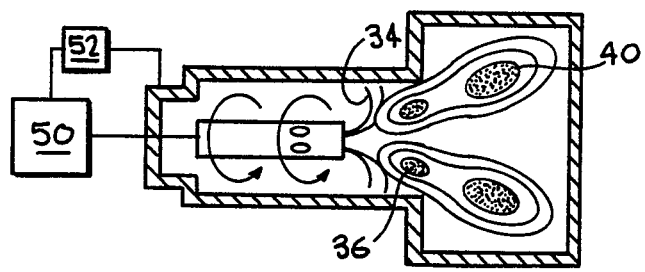
Figure 2:
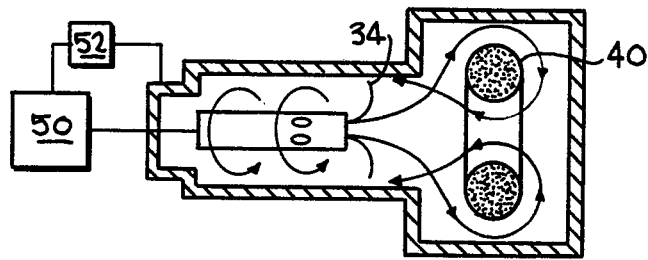

A power source 50 FIGS. 1 and 2 is connected to electrodes 12 by switching means 52, maintaining electrodes 12 at a constant voltage V. Switching means 52 like switching means 20 can be a variety of electronic components suited to switching high currents. Power source 50 is an electrical power supply capable of producing constant voltage output at varying power or current demands. The output of power source 50 is a voltage pulse whose length is determined from the relaxation time of CT 40 as discussed below, and preferably a continuous voltage output. Exemplary power sources include, but are not limited to, a regulated DC power supply employing step down transformers for reducing the voltage level from high voltage AC power lines and a bridge network for rectifying the AC input to a DC output. The constant voltage of power source 50 produces a current through plasma 30 present in gun 10 creating an increasing magnetic helicity 36 from flux between electrodes 12 which is initially localized near the plasma gun electrodes. This is indicated schematically in FIGS. 2a through 2e (energy source 20 and switch 22 not shown for clarity) where the flux lines 34 close to the gun begin to distort, 2a and 2b, pinch off near the gun electrodes, 2c, and then merge with CT 40, 2d and 2e.

With CT 40 in a minimum energy state so that Equation 3 is valid, and power source 50 maintaining a finite voltage continously across gun electrodes 12, a continuous input of magnetic energy P is present, $$P_\eta = \frac{k'}{2\mu_o} K \qquad (6)$$

$$= \frac{k'}{\mu_o} \psi_o V(t).$$

Adding this to the ohmic dissipation power we obtain instead of (5), $$\frac{dW_B}{dt} = \frac{k'}{\mu_o} \psi_o V(t) - P_\eta. \qquad (7)$$

With a constant voltage $$V = \frac{\mu_o P_\eta}{k'\psi_o}$$

maintained across gun electrodes 12, an average current $$I = \frac{k'\psi_o}{\mu_o}$$

is drawn from power source 50 and $dW_B/dt=0$ so that CT 40 does not decay. With $$V > \frac{\mu_o P_\eta}{k'\psi_o}$$

CT 40 magnetic fields build up on an arbitrarily slow quasi-static time scale.

Figure 3:
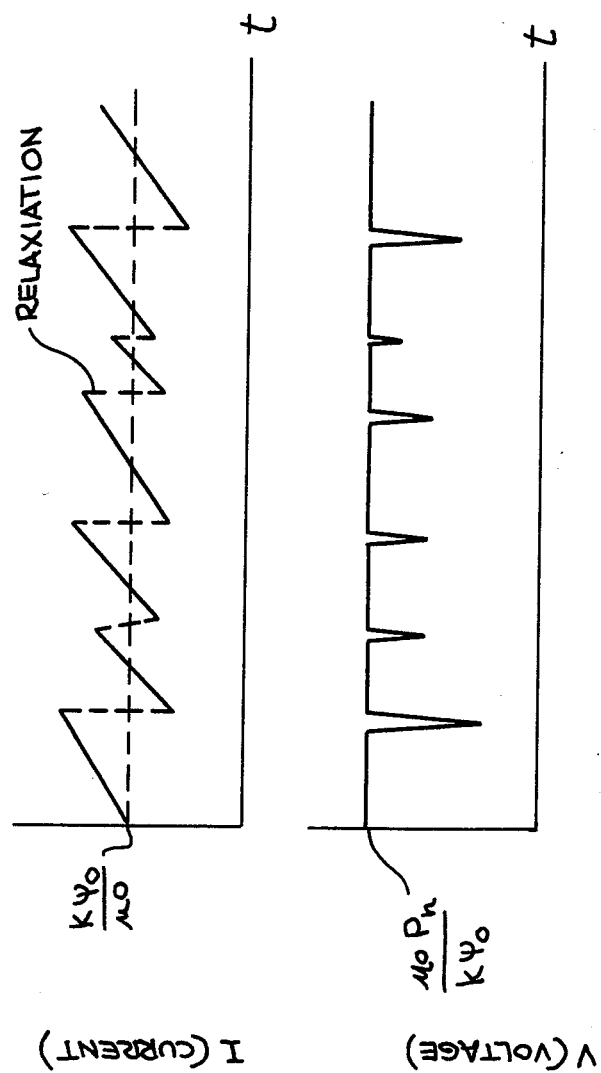
FIG. 3 is an illustrative set of current and voltage output waveforms for a constant voltage power supply connected across the coaxial plasma gun electrodes as helicity is added to the previously formed CT.

The constant voltage applied across gun electrodes 12 drives the composite plasma of plasma 30 and CT 40 away from the Taylor minimum energy state and the current flowing from power source 50 across electrodes 12 steadily increases. The plasma then relaxes to the minimum energy state, conserving helicity according to Taylor's relaxation hypothesis for the reversed field pinch. Relaxation of the plasma causes a drop in current, inducing a voltage spike across the gun terminals, bringing the composite plasma back to the minimum energy state and distributing helicity globally. The associated current and voltage waveforms are illustrated in FIG. 3.

The global relaxation serves to inject helicity into the core of CT 40 and thus maintain a time averaged steady state in the presence of ohmic dissipation. By injecting helicity at a rate exceeding ohmic dissipation the described technique also serves to build up a large CT from a small one on a time scale comparable to the undriven ohmic decay time and much slower than the Alfven time. This is important for reactor applications because it reduces the instantaneous power required to create a CT of large magnitude.

For a magnetized coaxial plasma gun producing CT's similar to the Beta II plasma apparatus in use at LLNL $W_B = 5kJ$, $\Psi_o = 0.01$ volt-sec, $k' = 0.13$ cm$^{-1}$. Taking the ohmic dissipated power as $$P = \frac{2W_B}{\tau_\eta}$$

with $\tau_\eta = \frac{\mu_o}{\eta k'^2}$ and $\eta = \frac{.5 \times 10^{-2} Z \ln\lambda}{T_e^{3/2}}$ ohm-cm, where:

$T_e$ = electron temperature in eV.

Z is the effective plasma ion charge and $\ln\lambda$ is the coulomb logarithm.

For a plasma composed of hydrogen, $Z=1$, the I, V values given in Table 1 are calculated for different $T_e(\tau_\eta)$ values.

| $T_e(\tau_\eta)$ | I | V |
|---|---|---|
| 10 eV (240 ms) | 103 kA | 410 volts |
| 100 eV (7.5 ms) | " | 13 volts |
| 1000 eV (.24 s) | " | .4 volts |

Figure 4:
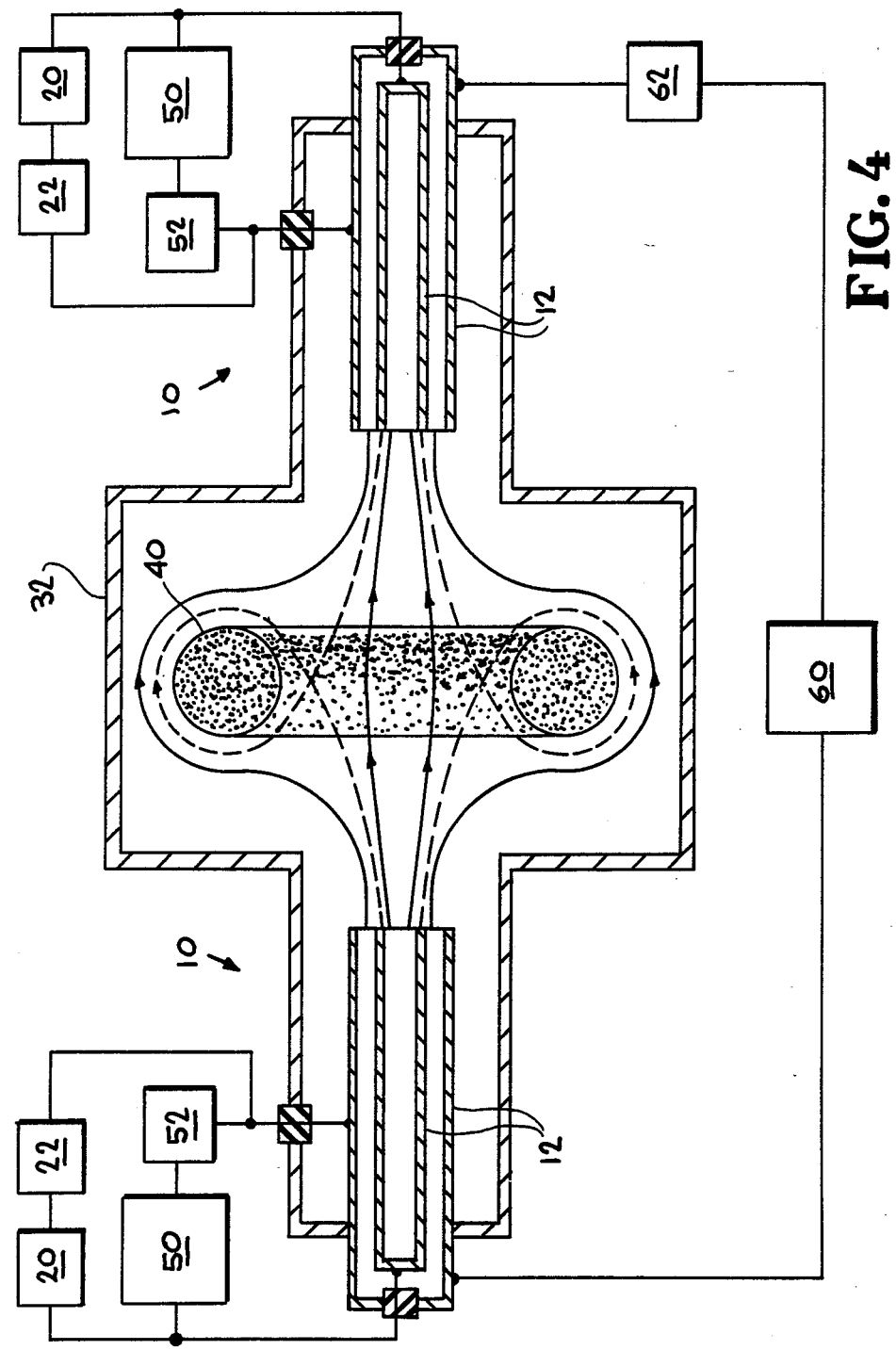
FIG. 4 is a schematic view of one embodiment of an apparatus having two magnetized coaxial plasma guns positioned opposing each other along a common axis, connected to a capacitive power supply for generating plasmas and also connected to a constant voltage power supply and in close proximity to an equilibrium field producing means.

Another embodiment operating in accordance with this invention is illustrated schematically in FIG. 4 wherein, two magnetized plasma guns 10 having electrodes 12, connected to an electrical energy source 20, through switching means 22, are positioned opposing each other on a common axis. After formation by one of plasma guns 10, CT 40 is held in equilibrium field producing means 32 which is positioned in close proximity to the gun electrodes 12 of both guns 10. As before equilibrium field means 32 comprises conductive walls, magnetic coils or a combination of both and is positioned according to the operating parameters of guns 10.

Energy source 20 is disconnected from electrodes 12, using switching means 22, and power source 50 is connected to electrodes 12, through switching means 52, maintaining electrodes 12 at a constant voltage V. A single energy source 20 and a single power source 50 can be used to drive both guns 10 or duplicate source 20 and source 50 can be used dependent on hardware limitations for guns 10 employed. The constant voltage from power source 50 produces increasing magnetic helicity in both plasma guns 10 which is initially localized near the plasma gun electrodes. In the same manner as illustrated schematically in FIG. 2, the flux lines close to the gun begin to distort, pinch off near the gun electrodes and then merge with the CT. The constant voltage applied across gun electrodes 12 drives the composite plasma and CT 40 away from the Taylor minimum energy state and the current flowing from power source 50 across electrodes 12 steadily increases. The plasma then undergoes relaxation injecting net helicity into CT 40 as previously discussed.

Using two plasma guns 10 creates an additional current path between the electrodes 12 of the separate plasma guns 10. A power source 60, which is functionally similar to power source 50, can be connected across the outer electrodes of opposing guns 10 allowing an axial current to flow through the toroidal configuration of CT 40 which also adds poloidal current to CT 40.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An apparatus for maintaining a field-reversed toroidally shaped plasma in a steady state mode comprising:
   at least one magnetized coaxial plasma gun for forming a toroidal plasma said means having cylindrically symmetric solenoidal electrodes for generating a poloidal magnetic field;
   means for maintaining the radial equilibrium of said toroidal plasmas after formation, said means being operatively coupled to said plasma gun; and
   means for producing magnetic helicity being operatively connected to said electrodes so as to produce increasing magnetic helicity from magnetic flux between said electrodes.

2. An apparatus for maintaining a steady state field-reversed toroidal plasma as recited in claim 1 wherein said means for producing magnetic helicity is a DC electrical power supply electrically connected to said electrodes through switching means.

3. An apparatus for maintaining a steady state toroidal plasma as recited in claim 1 wherein said means for maintaining radial equilibrium is a flux conservor having substantially cylindrical electrically conductive walls producing equilibrium magnetic fields by eddy currents in said conductive walls with the radius predetermined by the dimensions of said plasma gun and said toroidally shaped plasma.

4. The apparatus for maintaining steady state field-reversed toroidal plasma as recited in claim 1 wherein said means for maintaining radial equilibrium is an array of poloidal magnetic field coils.

5. An apparatus for producing steady state field-reversed toroidal plasmas comprising:
   at least one magnetized coaxial plasma gun for forming toroidally shaped plasmas having cylindrically symmetric solenoidal electrodes for generating a poloidal magnetic field, electrical input means for said electrodes, gas input means providing particle species for a discharge between said electrodes, and an open annular breech for passage of resulting toroidal plasmas;
   means for maintaining the radial equilibrium of said toroidal plasma after formation being operatively coupled to said plasma gun; and
   means for producing a constant voltage electrically connected to said electrodes through switching means.

6. An apparatus for producing steady state toroidal plasmas as recited in claim 5 further comprising a coating on the surfaces of said electrodes, said coating capable of having isotopes of hydrogen absorbed thereon.

7. An apparatus for producing steady state toroidal plasma as recited in claim 6 wherein said coating is a metallic liner made of material from the group consisting of tantalum, titanium, vanadium, zirconium or paladium.

8. An apparatus for producing steady state field-reversed toroidal plasma as recited in claim 5 wherein said means for producing a voltage is a regulated DC electrical power supply having;
   AC input means;
   transformer means having a primary winding connected to said AC input means and a secondary winding;
   rectifier means connected to said secondary winding; and
   regulation means connected to said rectifier means for adjusting the output voltage.

9. A method for producing steady state field-reversed toroidal plasmas using a magnetized coaxial plasma gun having cylindrically symmetric solenoidal electrodes for generating a poloidal magnetic field, electrical input means for said electrodes, gas input means providing particle species for a discharge between said electrodes, and an open annular breech for passage of a resulting compact toroidal plasma, the method comprising the steps of:
   flowing a particle species between said coaxial gun electrodes in sufficient quantity for creating a plasma upon application of predetermined discharge currents;
   forming a toroidal plasma by discharging an electrical energy storage means across said electrodes through a particle medium;
   confining said toroidal plasma in a radial equilibrium field immediately adjacent to said plasma gun; and
   producing an increasing magnetic helicity between said electrodes.

10. The method for producing steady state field-reversed toroidal plasmas as recited in claim 9 wherein said step of producing an increasing magnetic helicity between said electrodes further comprises the step of applying a continuous DC voltage to said electrodes, said voltage maintained at a constant level equal to or greater than the quantity $$\frac{\mu_o P_\eta}{k' \psi_o}.$$

11. The method for producing steady state field-reversed toroidal plasmas as recited in claim 10 wherein the step of applying a continuous voltage to said electrodes further comprises the step of converting AC voltages supplied by conventional utility sources to DC voltages with a regulated DC power supply means.

12. The method for producing steady state field-reversed toroidal plasmas as recited in claim 9 wherein the step of forming an increasing magnetic helicity between said electrodes further comprises the step of applying a constant DC voltage pulse to said electrodes, said voltage equal to or greater than the quantity $$\frac{\mu_o P_\eta}{k' \psi_o},$$

said pulse length predetermined by the known relaxation time of the toroidal plasma configuration.

13. The method for producing steady state field-reversed toroidal plasmas as recited in claim 9 further including the step of heating said toroidal plasma with at least one particle beam directed so as to intersect said toroidal plasma.

14. The method for producing steady state field-reversed toroidal plasmas as recited in claim 9 further including the step of heating said toroidal plasma with radio frequency waves directed at said toroidal plasma by at least one transmission antenna.

15. The method for producing steady state field-reversed toroidal plasmas as recited in claim 9 further including the step of introducing deuterium or tritium into said particle species.

* * * * *